(12) United States Patent
Miyahara et al.

(10) Patent No.: US 12,393,549 B2
(45) Date of Patent: Aug. 19, 2025

(54) DATA STORAGE DEVICE, DATA STORAGE METHOD, AND DATA STORAGE PROGRAM

(71) Applicant: NIPPON TELEGRAPH AND TELEPHONE CORPORATION, Tokyo (JP)

(72) Inventors: Kazuhiro Miyahara, Tokyo (JP); Tatsuro Kimura, Tokyo (JP); Kimihiro Yamamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/265,900

(22) PCT Filed: Dec. 9, 2020

(86) PCT No.: PCT/JP2020/045877
§ 371 (c)(1),
(2) Date: Jun. 7, 2023

(87) PCT Pub. No.: WO2022/123691
PCT Pub. Date: Jun. 16, 2022

(65) Prior Publication Data
US 2023/0376458 A1   Nov. 23, 2023

(51) Int. Cl.
*G06F 16/14* (2019.01)
*G06F 16/29* (2019.01)

(52) U.S. Cl.
CPC .......... *G06F 16/148* (2019.01); *G06F 16/156* (2019.01); *G06F 16/29* (2019.01)

(58) Field of Classification Search
CPC ....... G06F 16/148; G06F 16/156; G06F 16/29
See application file for complete search history.

(56) References Cited

U.S. PATENT DOCUMENTS

| | | | |
|---|---|---|---|
| 2012/0275263 A1* | 11/2012 | Kloss | G01S 7/52004 367/13 |
| 2016/0188996 A1* | 6/2016 | Modica | G06F 16/50 382/203 |
| 2016/0275719 A1* | 9/2016 | Oke | G06T 17/005 |

FOREIGN PATENT DOCUMENTS

| | | |
|---|---|---|
| JP | 2018041431 A | 3/2018 |
| JP | 2018136642 A | 8/2018 |

* cited by examiner

*Primary Examiner* — Grace Park (57) ABSTRACT

A data storage device (10) divides an LAS data file into a plurality of continuous byte ranges by using information obtained by plotting a series of values of LAS data indicated by the LAS data file on a plane with a latitude and longitude as axes, and determines coordinates serving as search keys for the byte range divisions. Here, when dividing the LAS data file, the data storage device (10) divides the LAS data file so that the LAS data included in a byte range division falls within a predetermined distance from the coordinates serving as the search key for the byte range. Then, the data storage device (10) stores division information indicating the determined coordinates of the search key and the byte range of the LAS data file corresponding to the search key in association with each other in a storage unit. Then, the data storage device (10) searches the LAS data for which a search request is requested from the LAS data file by using the division information.

6 Claims, 10 Drawing Sheets

DATA STORAGE DEVICE, DATA STORAGE METHOD, AND DATA STORAGE PROGRAM

CROSS-REFERENCE TO RELATED APPLICATIONS

This application is a U.S. National Stage Application filed under 35 U.S.C. § 371 claiming priority to International Patent Application No. PCT/JP2020/045877, filed on 9 Dec. 2020, the disclosure of which is hereby incorporated herein by reference in its entirety.

TECHNICAL FIELD

The present invention relates to a data storage device, a data storage method, and a data storage program for LAS data.

BACKGROUND ART

Conventionally, there is LAS data as terrain information data measured by a light detection and ranging (LiDAR) sensor. In order to efficiently search LAS data, there is a method of registering LAS data files in a database which can be searched in a spatial coordinate range, and realizing searching in units of files. In addition, there is a method of improving the search accuracy by dividing the LAS data file according to a mesh (spatial grid) defined in advance on a predetermined space, thereby making the unit of data to be registered in the database finer.

CITATION LIST

Patent Literature

[PTL 1] Japanese Patent Application Publication No. 2018-136642
[PTL 2] Japanese Patent Application Publication No. 2018-041431

SUMMARY OF INVENTION

Technical Problem

The above LAS data files range from several hundred MB to several GB per file. Therefore, in a case where an LAS data file is registered in a database which can be searched in a spatial coordinate range, when an application uses an LAS data file found in a database for actual processing, it is necessary to perform additional processing of extracting the range used for actual processing from the found LAS data file. Therefore, this method is not preferable from the viewpoint of convenience of searching an LAS data file.

LAS data is data obtained by reciprocating a large number of laser beams of a LiDAR over a narrow range. Therefore, when an LAS data file is divided according to a spatial grid and registered in a database, the number of divisions of the LAS data file to be registered in the database becomes large. Therefore, this method is not preferable from the viewpoint of the index management of a database.

Accordingly, it is an object of the present invention to solve the above-described problems and to efficiently search LAS data with a data size suitable for use in an application or the like.

Solution to Problem

In order to achieve the above object, according to the present invention, there is provided a data storage device including: a division unit configured to divide an LAS data file into a plurality of continuous byte ranges by using information obtained by plotting a series of values of LAS data indicated by the LAS data file on a plane with a latitude and longitude as axes, to determine coordinates serving as a search key for each of the byte range divisions on the plane, and to divide the LAS data file so that the LAS data included in a byte range division falls within a predetermined distance from the coordinates serving as the search key for the byte range on the plane; and a division information management unit configured to store division information, which is information indicating the determined coordinates of the search key and the byte range of the LAS data file corresponding to the search key in association with each other, in a storage unit.

Advantageous Effects of Invention

According to the present invention, it is possible to efficiently search LAS data with a data size suitable for use in an application or the like.

DESCRIPTION OF EMBODIMENTS

Hereinafter, modes for carrying out the present invention (embodiments) will be described with reference to the drawings. The present invention is not limited to the embodiment described below.

First, LAS data handled by a data storage device according to the present embodiment will be described with reference to FIG. 1. The LAS data is data in which coordinate information obtained as an irradiation destination of a rotating laser of the LiDAR is arranged in time series.

Figure 1:
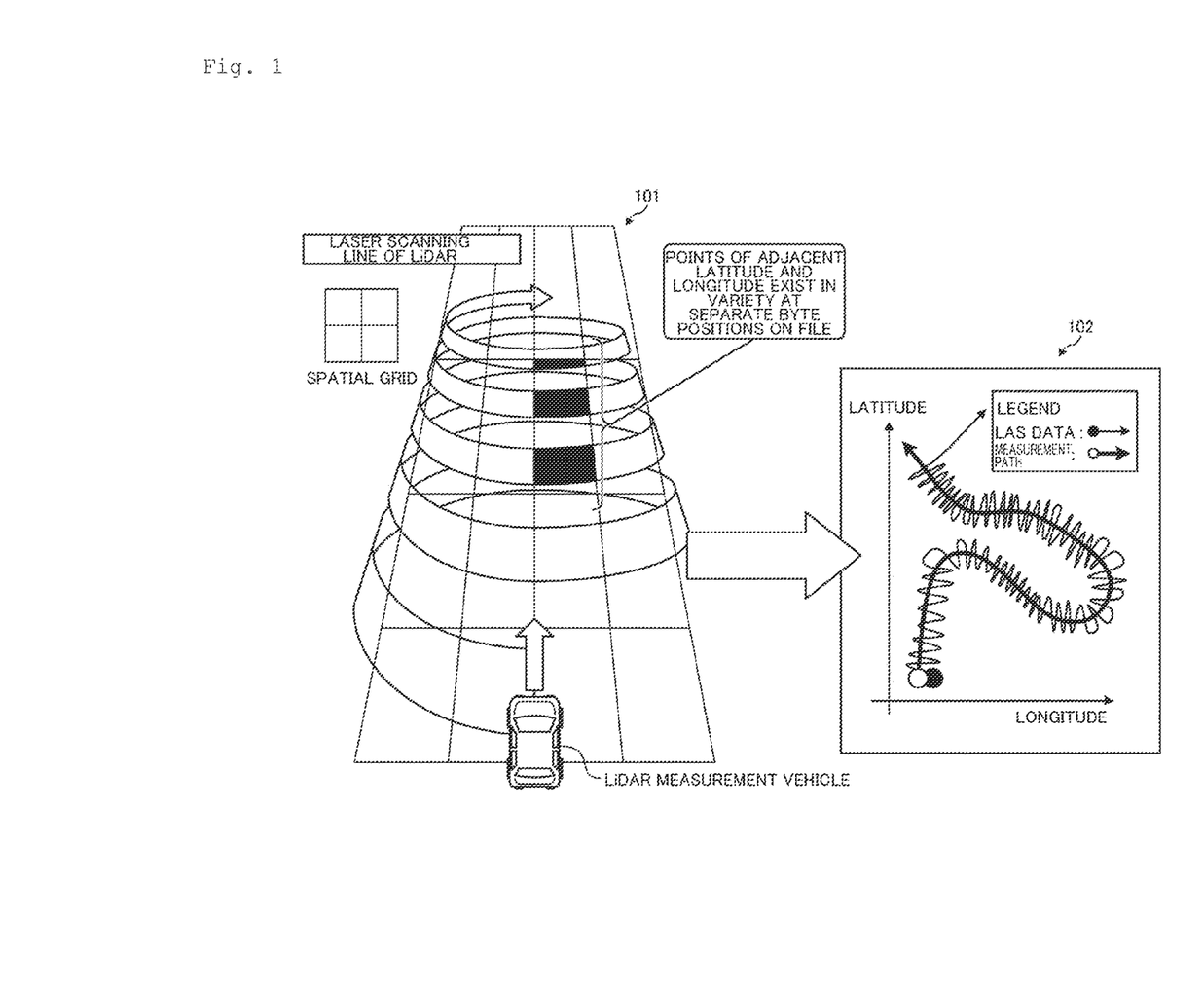
FIG. 1 is a diagram illustrating LAS data.

For example, as indicated by reference numeral 101 in FIG. 1, a LiDAR measurement vehicle emits a laser beam of the LiDAR in the traveling direction while rotating the laser beam to obtain coordinate information of the irradiation destination. Here, the laser scanning line of the LiDAR is indicated by reference numeral 101, for example. The LAS data obtained as described above can be plotted, for example, on a plane indicated by reference numeral 102 with a latitude and longitude as axes. Here, the LAS data is coordinate information obtained by emitting the laser beam of the LiDAR while rotating the laser beam, and is expressed as an amplitude curve on a plane with a latitude and longitude as axes. That is, on the plane indicated by reference numeral 102, the measurement data (coordinate information) indicated by the LAS data is expressed as a curve having an amplitude with respect to the measurement path.

Configuration Example

Next, with reference to FIG. 2, a configuration example of a data storage system including the data storage device according to the present embodiment will be described.

Figure 2:
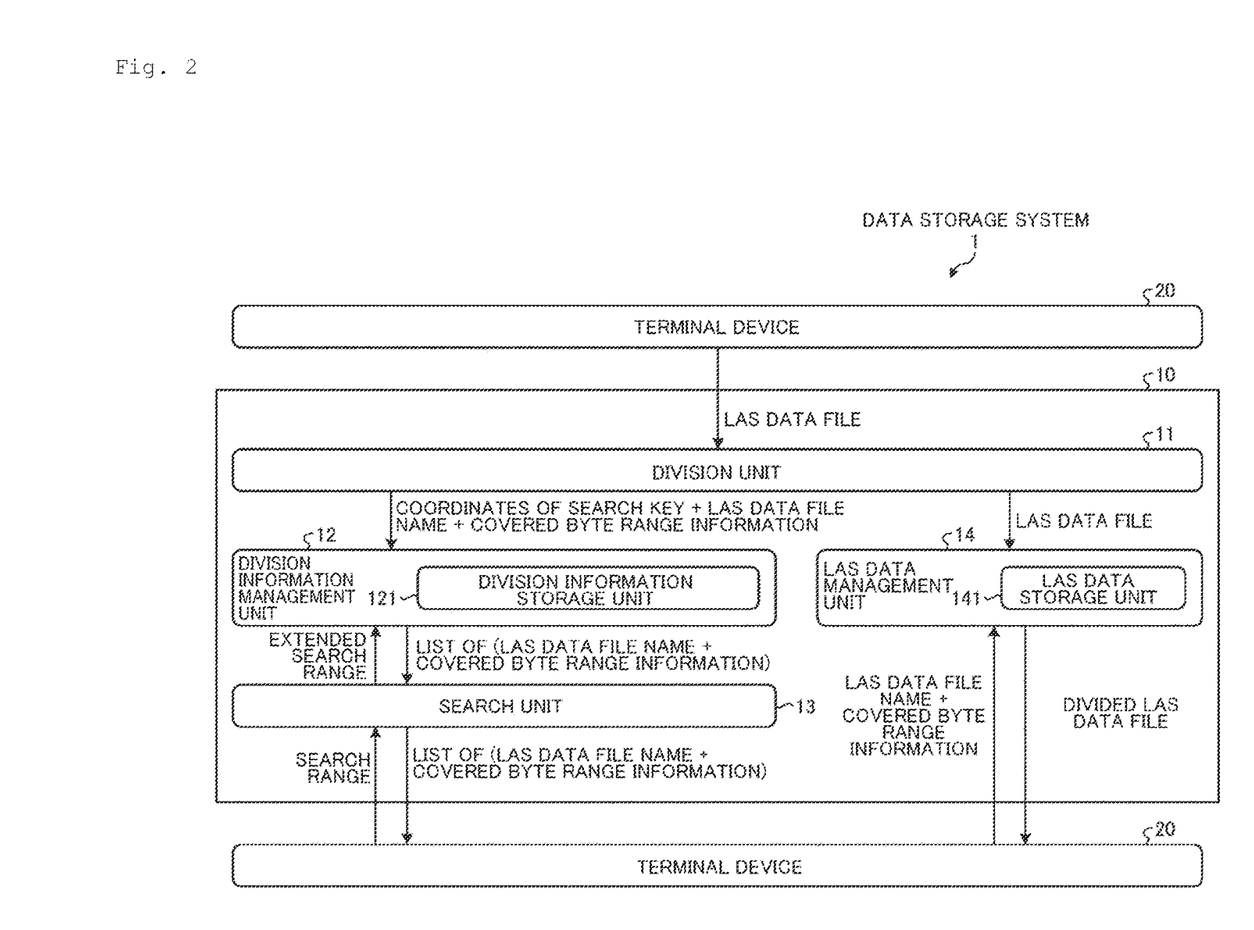
FIG. 2 is a diagram illustrating a configuration example of a data storage system.

As illustrated in FIG. 2, a data storage system 1 includes, for example, a data storage device 10 and a terminal device 20. The data storage device 10 stores an LAS data file and division information of the LAS data file (details will be described later). Also, the data storage device 10 searches LAS data of the LAS data file on the basis of a search request from the terminal device 20 and returns it to the terminal device 20. The terminal device 20 is, for example, a terminal operated by an operator or the like of the data storage system 1. The terminal device 20 is implemented by, for example, a personal computer or the like. The terminal device 20 and the data storage device 10 are communicatively connected via a network.

The data storage device 10 includes a division unit 11, a division information management unit 12, a search unit 13, and an LAS data management unit 14.

[Division Unit]

The division unit 11 divides the LAS data file into units suitable for searching. For example, upon receiving the LAS data file from the terminal device 20, the division unit 11 divides the LAS data file into a plurality of continuous byte ranges. Then, for each of the byte range divisions, the division unit 11 determines coordinates serving as a search key for the byte range.

At this time, the division unit 11 makes the data included in a byte range division fall within a distance which is set in advance (hereinafter referred to as a "division radius" as appropriate) with the coordinates serving as the search key as a center. The value of the division radius can be changed appropriately by an administrator or the like of the data storage system 1. Further, the division unit 11 may actually divide the LAS data file or manage only the byte range when dividing the LAS data file. An example of processing of determining a byte range and a search key for the byte range by the division unit 11 will be described with reference to FIG. 3.

Figure 3:
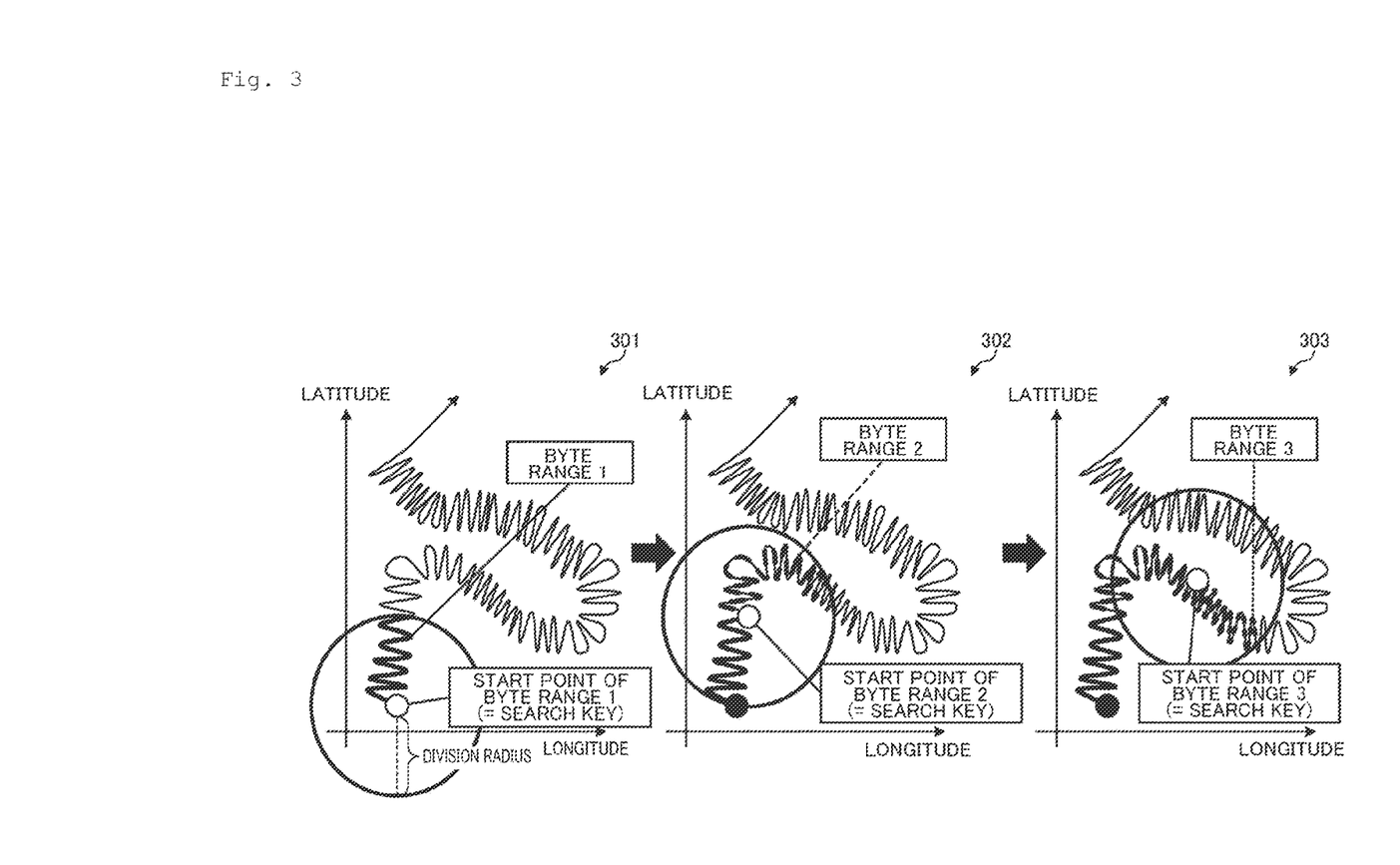
FIG. 3 is a diagram illustrating a method of determining a byte range and a search key.

(1) For example, as indicated by reference numeral 301 in FIG. 3, the division unit 11 draws a circle having a predetermined division radius as a radius, with the coordinates of the first point of the LAS data file as a center.

(2) Next, the division unit 11 successively checks the coordinates in the LAS data file, and when the first coordinates coming out of the circle are found, terminates the byte range there. Although the division unit 11 may check coordinates in the LAS data file one set at a time when finding the first coordinates coming out of the circle, in order to shorten the time required for coordinate checking processing, the checking may be performed while skipping several hundred points.

(3) The division unit 11 uses the coordinates of the center of the circle (for example, the start point of byte range 1) as a search key for a byte range 1 for the above byte range (byte range 1).

For the second and subsequent byte ranges, the division unit 11 draws a circle having a division radius as a radius, with the last coordinates of the byte range immediately before the LAS data file as a center, and repeats the processing of (2) and (3).

For example, as indicated by reference numeral 302, the division unit 11 draws a circle having a division radius as a radius, with the last coordinates of the byte range 1 of the LAS data file as a start point of a byte range 2. Then, when the first coordinates coming out of the circle are found, the division unit 11 terminates the byte range 2 there. The division unit 11 uses the start point of the byte range 2 as a search key of the byte range 2.

Further, as indicated by reference numeral 303, the division unit 11 draws a circle having a division radius as a radius, with the last coordinates of the byte range 2 of the LAS data file as a start point of a byte range 3. Then, when the first coordinates coming out of the circle are found, the division unit 11 terminates the byte range 3 there. The division unit 11 uses the start point of the byte range 3 as a search key of the byte range 3.

Figure 4:
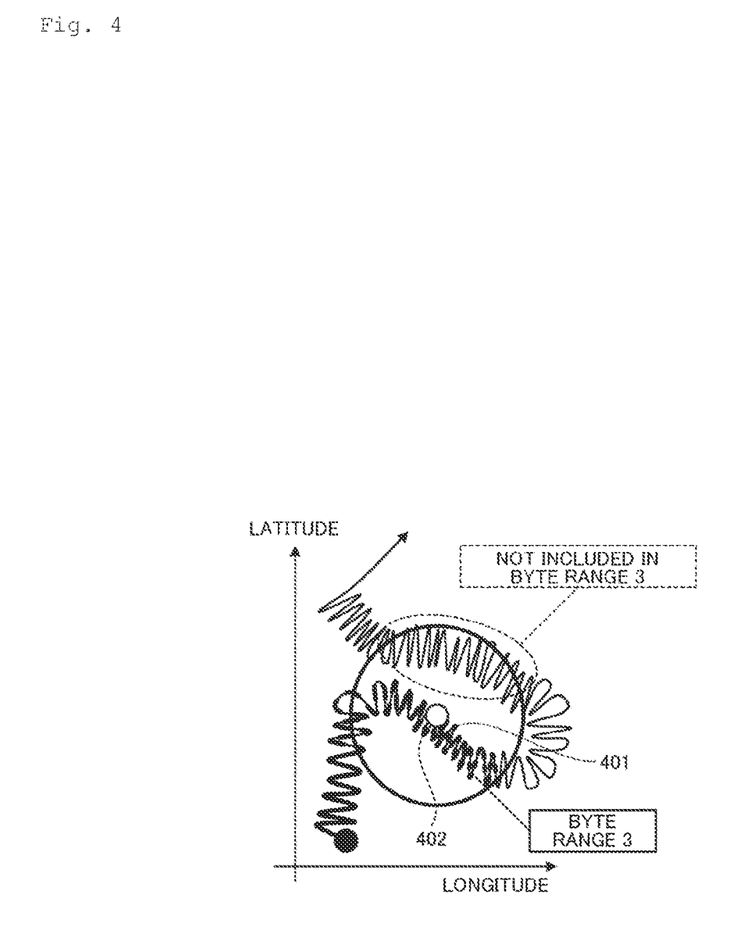
FIG. 4 is a diagram illustrating a method of determining a byte range.

Since the division unit 11 terminates the byte range at the point in time when the first coordinates coming out of the circle of the division radius are found, for example, the byte range indicated by reference numeral 401 in FIG. 4 is included in the byte range 3 with reference numeral 402 as a start point, but the byte range ahead of the byte range indicated by reference numeral 401 (for example, the byte range enclosed by a broken line) is not included in the byte range 3.

By repeating the above processing, the division unit 11 can divide the LAS data file into a plurality of byte ranges and determine search keys for the byte range divisions.

Thereafter, the division unit 11 outputs information indicating the determined search key and the byte range corresponding to the search key in association with each other as division information. For example, the division unit 11 outputs division information in which coordinates of a search key, a name of an LAS data file to be divided, and information indicating a byte range corresponding to the search key (covered byte range information) are associated with each other to the division information management unit 12.

[Division Information Management Unit]

The division information management unit 12 manages the division information output by the division unit 11. For example, the division information management unit 12 includes a division information storage unit 121, and stores the division information output from the division unit 11 in the division information storage unit 121. The division information management unit 12 searches the LAS data file name and the covered byte range information included in the search range designated by the search unit 13 from the division information stored in the division information storage unit 121, and returns the search result to the search unit 13.

For example, upon receiving a predetermined search range (for example, an extended search range; details will be described later) from the search unit 13, the division information management unit 12 uses the division information stored in the division information storage unit 121 to search division information having a search key included in the search range. Then, the division information management unit 12 reads the LAS data file name and the covered byte range information associated with the search key on the basis of the found division information, and returns a list of the read LAS data file name and covered byte range information to the search unit 13.

[Search Unit]

Upon receiving a search request for LAS data including a search range from the terminal device 20, the search unit 13 returns a list of the LAS data file name and the covered byte range information of the LAS data included in the search range to the terminal device 20.

For example, upon receiving a search request from the terminal device 20, the search unit 13 calculates a search range (extended search range) obtained by extending a search range designated by the search request by the division radius. Then, the search unit 13 outputs the calculated extended search range to the division information management unit 12. Thereafter, upon receiving a list of the LAS data file name and the covered byte range information included in the extended search range from the division information management unit 12, the search unit 13 outputs the list of the LAS data file name and the covered byte range information to the terminal device 20.

Figure 5:
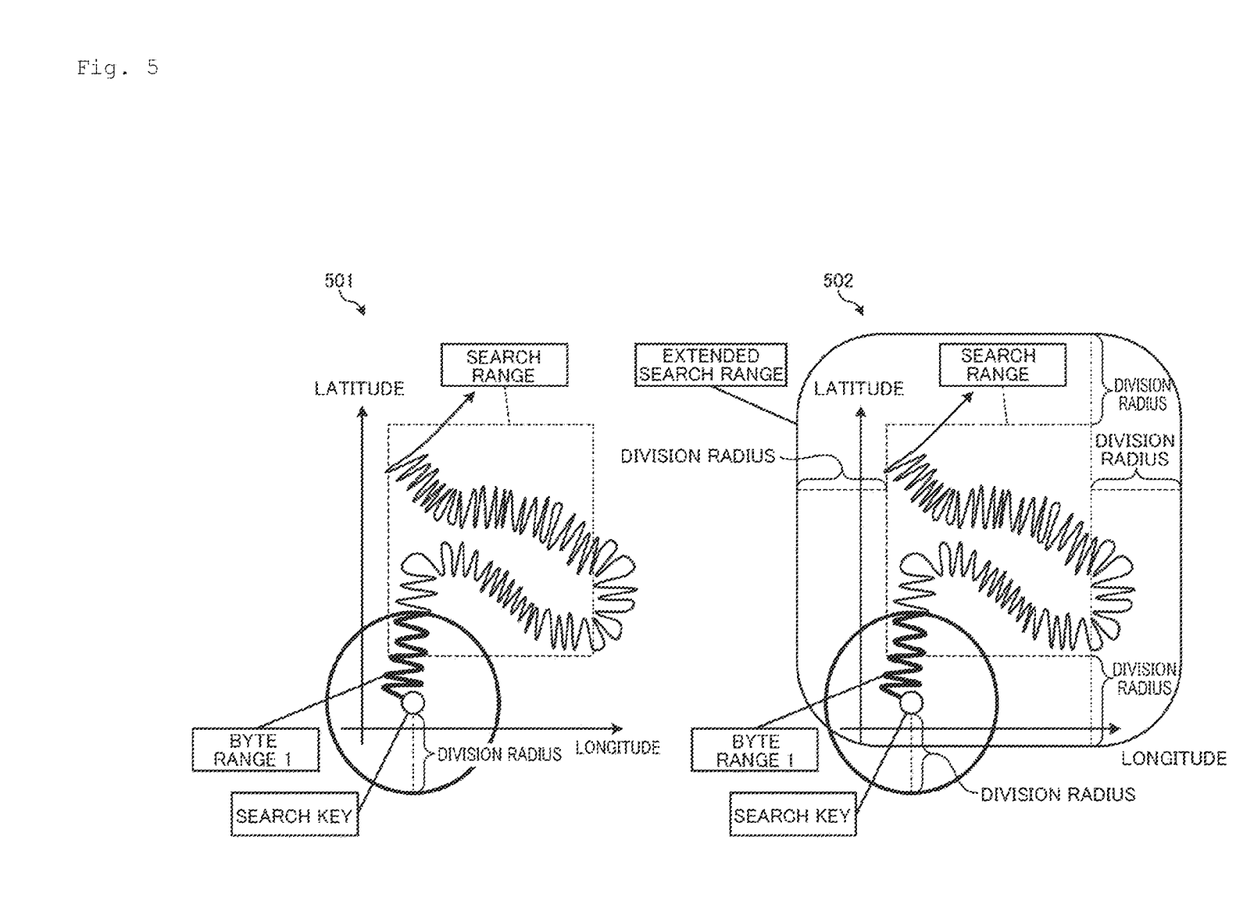
FIG. 5 is a diagram illustrating a search using an extended search range.

Here, with reference to FIG. 5, a search using the extended search range will be described. The search range indicated by reference numeral 501 is a search range designated by a search request from the terminal device 20. For example, when the division information management unit 12 searches a search key included in the search range indicated by reference numeral 501, the search key in the byte range 1 is not included in the search range. Therefore, although a part of the byte range 1 is included in the search range, there is a concern of omission from the search.

That is, the coordinates of the search key are separated from the coordinates of the data in the byte range corresponding to the search key by the division radius at most. Therefore, if the division information management unit 12 searches the search key by using the designated search range as it is, search omission occurs.

Therefore, the search unit 13 calculates an extended search range obtained by extending the search range by the division radius as indicated by reference numeral 502. Then, the division information management unit 12 searches a search key by using the extended search range. Thus, when at least a part of the byte range is included in the search range, the division information management unit 12 always includes the search key corresponding to the byte range in the extended search range. As a result, the division information management unit 12 can search the byte range at least partially included in the search range without omission.

Figure 6:
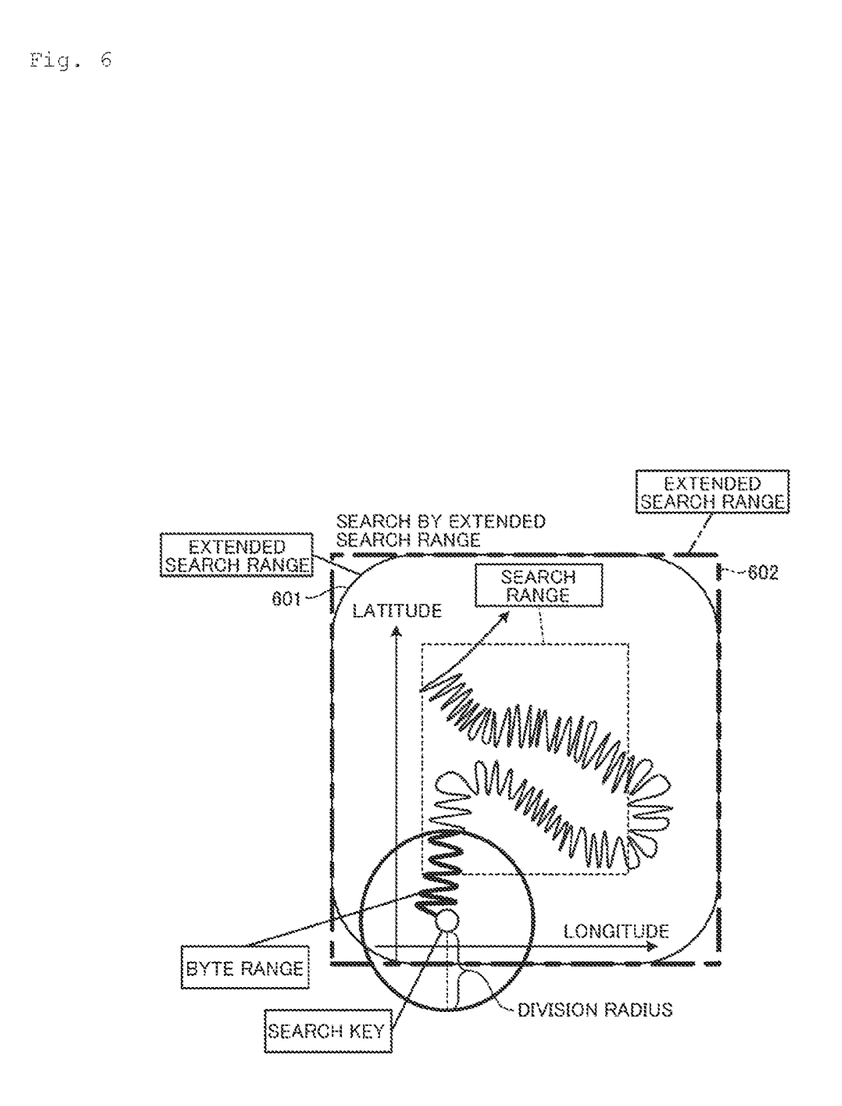
FIG. 6 is a diagram illustrating a modification example of an extended search range.

Note that the extended search range becomes a complicated shape with a mixture of straight lines and curves when trying to make it a necessary and sufficient range for the search range, as indicated by reference numeral 601 in FIG. 6, for example. Therefore, when the search unit 13 calculates the extended search range, the extended search range may have a simple shape including a necessary and sufficient range for the search range. For example, as indicated by reference numeral 602, the search range may be extended by a division radius in the latitude and longitude directions. Thus, the search unit 13 can easily calculate the extended search range, and the division information management unit 12 can also easily perform search processing.

[LAS Data Management Unit]

The description will now return to FIG. 2. The LAS data management unit 14 manages the LAS data file. For example, the LAS data management unit 14 includes an LAS data storage unit 141, and stores the LAS data file output from the division unit 11 in the LAS data storage unit 141.

Upon receiving an acquisition request for data from the terminal device 20, the LAS data management unit 14 retrieves the LAS data (divided LAS data file) of the LAS data file indicated in the acquisition request from the LAS data storage unit 141 and outputs the LAS data to the terminal device 20.

For example, upon receiving the LAS data file name and the covered byte range information to be acquired from the terminal device 20, the LAS data management unit 14 retrieves the LAS data in the byte range indicated by the covered byte range information from the LAS data file of the LAS data file name in the LAS data storage unit 141. Then, the LAS data management unit 14 outputs the retrieved LAS data to the terminal device 20.

According to the data storage device 10 described above, it is possible to efficiently search LAS data with a data size suitable for use in an application or the like.

[Example of Processing Procedure]

Figure 7:
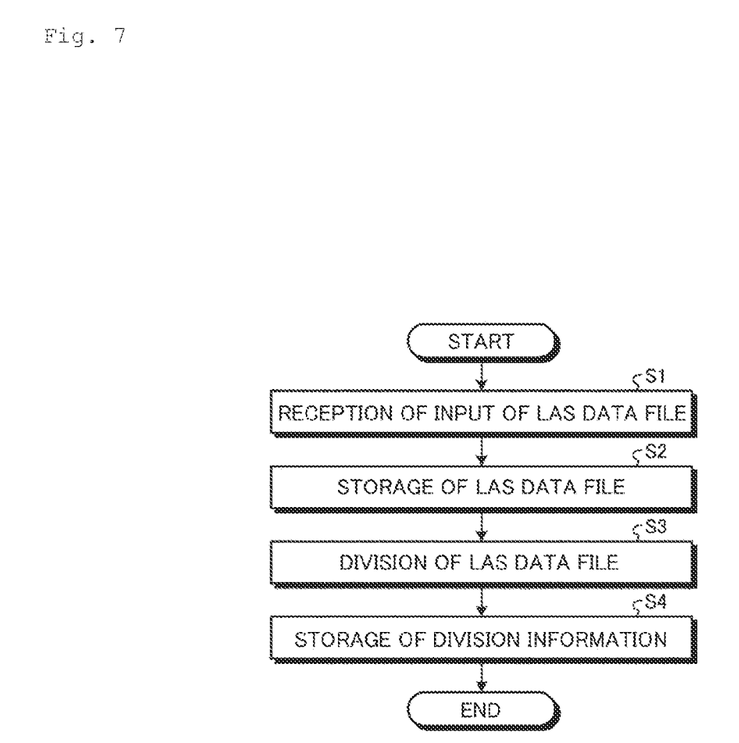
FIG. 7 is a flowchart illustrating an example of a procedure for a data storage device to store an LAS data file and division information of the LAS data file.
Figure 8:
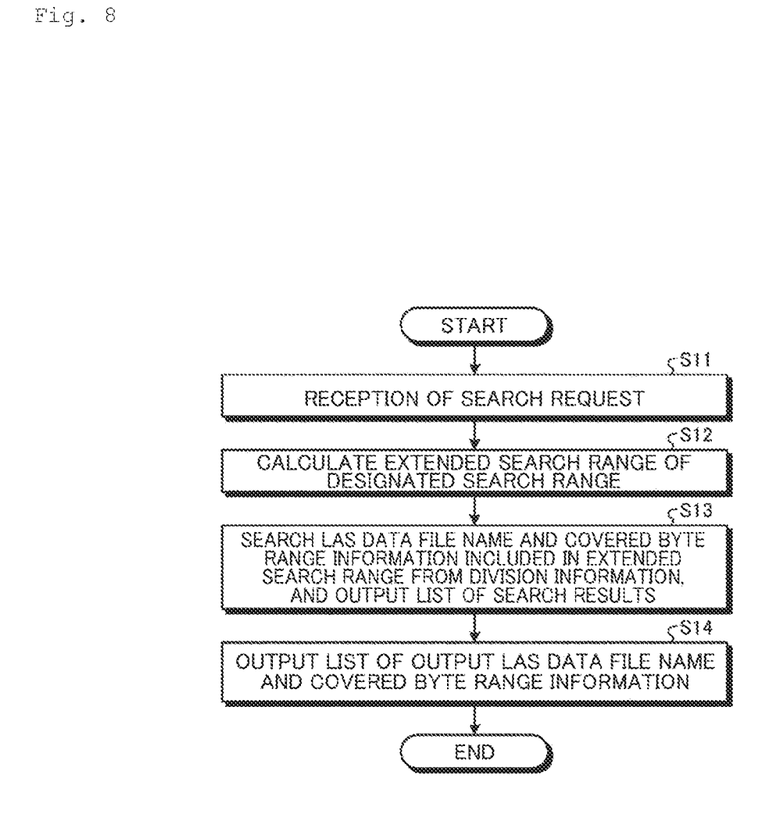
FIG. 8 is a flowchart illustrating an example of a processing procedure when the data storage device receives a search request from a terminal device after the processing illustrated in FIG. 7.

Next, an example of a processing procedure of the data storage device 10 will be described with reference to FIGS. 7 to 9. First, an example of the procedure for the data storage device 10 to store the LAS data file and the division information of the LAS data file will be described with reference to FIG. 7.

First, the data storage device 10 receives an input of the LAS data file (S1). Then, the division unit 11 outputs the LAS data to the LAS data management unit 14. The LAS data management unit 14 stores the LAS data file in the LAS data storage unit 141 (S2: storage of the LAS data file).

Also, the division unit 11 divides the LAS data file input in S1 (S3). For example, upon receiving the LAS data file, the division unit 11 divides the LAS data file into a plurality of continuous byte ranges. Then, for each of the byte range divisions, the division unit 11 determines coordinates serving as a search key for the byte range. Next, the division unit 11 outputs the coordinates of the search key, the name of the LAS data file to be divided, and information indicating the byte range corresponding to the search key (covered byte range information) to the division information management unit 12 as division information. Then, the division information management unit 12 stores the division information in the division information storage unit 121 (S4: storage of the division information).

By the above processing, the data storage device 10 can create and store the division information of the LAS data file.

Next, with reference to FIG. 8, an example of a processing procedure when the data storage device 10 receives a search request from the terminal device 20 after the processing illustrated in FIG. 7 will be described.

Upon receiving a search request from the terminal device 20 (S11: reception of the search request), the search unit 13 of the data storage device 10 calculates an extended search range of the search range designated by the search request (S12). Then, the search unit 13 outputs the calculated extended search range to the division information management unit 12.

After S12, the division information management unit 12 searches the LAS data file name and the covered byte range information included in the extended search range calculated in S12 from the division information in the division information storage unit 121, and outputs a list of search results to the search unit 13 (S13).

After S13, the search unit 13 outputs a list of the LAS data file name and the covered byte range information output from the division information management unit 12 to the terminal device 20 (S14).

By the above processing, the data storage device 10 can present a list of the LAS data file name and the covered byte range information included in the search range designated by the search request to the terminal device 20 which is the transmission source of the search request.

Figure 9:
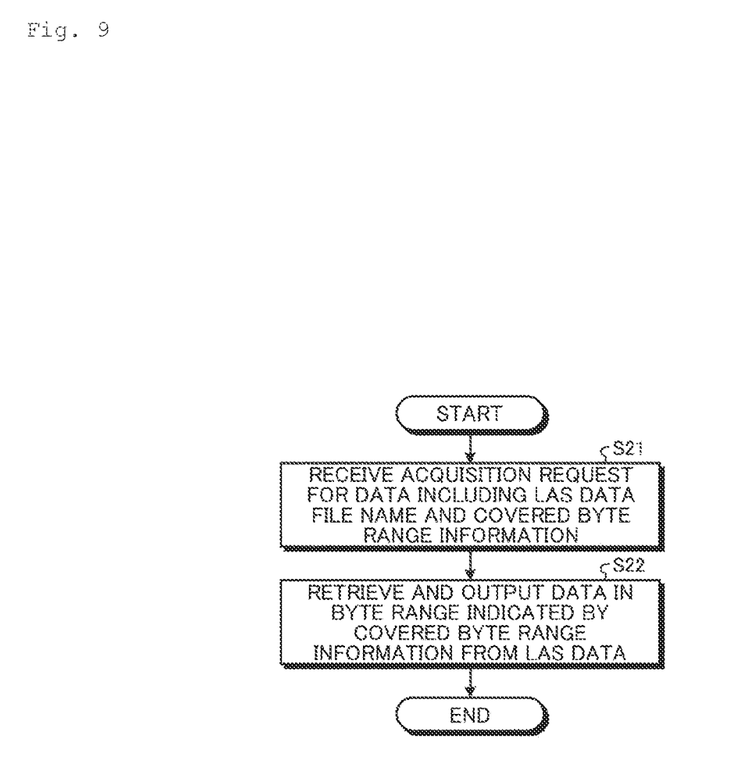
FIG. 9 is a flowchart illustrating an example of a processing procedure when the data storage device receives an acquisition request for data from the terminal device after the processing illustrated in FIG. 8.

Thereafter, when the data storage device 10 receives a selection input of the LAS data file name and the covered byte range information for an acquisition request for data from the terminal device 20, the data storage device 10 executes the processing illustrated in FIG. 9, for example.

When the LAS data management unit 14 of the data storage device 10 receives an acquisition request for data including an LAS data file name and covered byte range information from the terminal device 20 (S21), the LAS data management unit 14 acquires the LAS data file of the LAS data file name from the LAS data storage unit 141. Then, the LAS data management unit 14 retrieves data in a byte range indicated by the covered byte range information from the acquired LAS data file, and outputs the data to the terminal device 20 (S22).

Thus, the data storage device 10 can output the LAS data desired by the user of the terminal device 20 to the terminal device 20.

In the above-described embodiment, the data storage device 10 outputs a list of the LAS data file name and the covered byte range information of the search range designated by the search request as a response to the search request from the terminal device 20, but the present invention is not limited thereto. For example, the data storage device 10 may directly output the LAS data in the search range designated by the search request.

[System Configuration and Others]

In addition, each component of each unit that has been illustrated is functionally conceptual, and is not necessarily physically configured as illustrated. That is, a specific form of distribution and integration of individual devices is not limited to the illustrated form, and all or a part of the configuration can be functionally or physically distributed and integrated in any unit according to various loads, usage conditions, and the like. Furthermore, all or any part of each processing function performed in each device can be realized by a CPU and a program executed by the CPU, or can be realized as hardware by a wired logic.

Also, out of the steps of processing described in the foregoing embodiment, all or some of the steps of processing described as being automatically executed may also be manually executed. Alternatively, all or some of the steps of processing described as being manually executed may also be automatically executed using a known method. In addition, the processing procedure, the control procedure, specific names, information including various types of data and parameters that are shown in the above document and drawings may be arbitrarily changed unless otherwise described.

[Program]

The data storage device 10 described above can be implemented by installing a program as package software or online software in a desired computer. For example, an information processing device is caused to execute the above program, making it possible to cause the information processing device to function as the data storage device 10 of each embodiment. The information processing device mentioned here includes a desktop or laptop personal computer. In other cases, the information processing device includes a mobile communication terminal such as a smartphone, a mobile phone, or a personal handyphone system (PHS), and further includes terminals such as a personal digital assistant (PDA), or the like.

The data storage device 10 can also be implemented as a server device that uses a terminal device used by a user as a client and provides the client with services related to the above processing. In this case, the server device may be implemented as a Web server, or may be implemented as a cloud that provides services related to the above processing through outsourcing.

Figure 10:
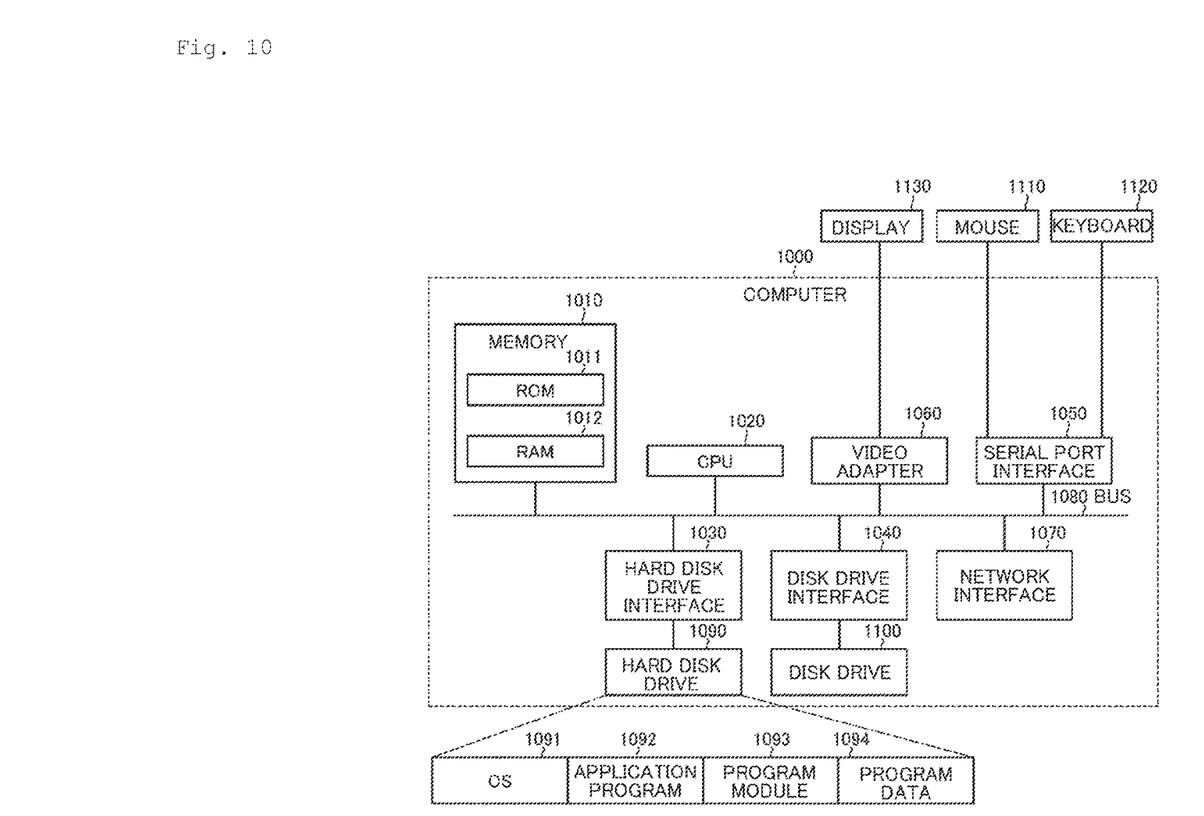
FIG. 10 is a diagram illustrating a configuration example of a computer for executing a data storage program.

FIG. 10 is a diagram illustrating an example of a computer for executing a data storage program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines each piece of processing executed by the data storage device 10 is implemented as the program module 1093 in which a code that can be executed by a computer is described. The program module 1093 is stored in, for example, the hard disk drive 1090. For example, the program module 1093 for executing the same processing as the functional configuration in the data storage device 10 is stored in the hard disk drive 1090. Note that the hard disk drive 1090 may also be replaced by an SSD.

Furthermore, each piece of data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 into the RAM 1012 and executes them as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may also be stored in another computer that is connected via a network (a local area network (LAN), a wide area network (WAN), or the like). Then, the program module 1093 and the program data 1094 may be read by the CPU 1020 from another computer via the network interface 1070.

REFERENCE SIGNS LIST

1 Data storage system
10 Data storage device
11 Division unit
12 Division information management unit 13 Search unit
14 LAS data management unit
20 Terminal device
121 Division information storage unit
141 LAS data storage unit

The invention claimed is:

1. A data storage device comprising a processor configured to execute operations comprising:
  obtaining Light Detecting and Ranging ("LiDAR) data by plotting a series of values of LiDAR Aerial Survey ("LAS") data on a plane with latitude and longitude as axes from an LAS data file, wherein
    the LAS data file is associated with terrain information data measured by a LiDAR sensor,
    the LAS data file includes LAS data, and
    the LAS data indicates a curve having an amplitude with respect to a measurement path with a latitude and longitude as axes;
  determining coordinates representing a search key for each of a plurality of byte range divisions on the plane, wherein the coordinates comprise a latitude and a longitude;
  dividing the LAS data file into a plurality of byte ranges, wherein a piece of byte range of the plurality of byte ranges comprises a piece of continuous LAS data in a byte range division of the plurality of byte range divisions within a predetermined distance from a piece of coordinates, and the piece of coordinates represents the search key for the piece of byte range on the plane;
  storing division information, wherein the division information indicates the determined coordinates of the search key and the piece of byte range of the LAS data file corresponding to the search key, and the piece of byte range represents a search range in the LAS data file corresponding to the search key;
  receiving a search request including the search range of the LAS data file;
  searching the piece of byte range of the LAS data file included in the search range of the LAS data file on the basis of the division information, the searching further comprising:
    calculating a range obtained by extending the search range of the LAS data file by the predetermined distance,
    specifying the search key within the extended search range on the basis of the division information, and
    searching the piece of byte range of the LAS data file corresponding to the specified search key; and
  outputting a result of the searching.

2. The data storage device according to claim 1, the processor further configured to execute operations comprising:
  receiving an acquisition request for data including the piece of byte range of the LAS data file; and
  retrieving and outputting, in response to the receiving of the acquisition request, the data of the piece of byte range from the LAS data file.

3. A data storage method executed by a data storage device, the data storage method comprising:
  obtaining Light Detecting and Ranging ("LiDAR) data by plotting a series of values of LiDAR Aerial Survey ("LAS") data on a plane with latitude and longitude as axes from an LAS data file, wherein
    the LAS data file is associated with terrain information data measured by a LiDAR sensor,
    the LAS data file includes LAS data, and
    the LAS data indicates a curve having an amplitude with respect to a measurement path with a latitude and longitude as axes;
  determining coordinates representing a search key for each of a plurality of byte range divisions on the plane, wherein the coordinates comprise a latitude and a longitude;
  dividing the LAS data file into a plurality of byte ranges, wherein a piece of byte range of the plurality of byte ranges comprises a piece of continuous LAS data in a byte range division falls of the plurality of byte range divisions within a predetermined distance from a piece of coordinates, and the piece of coordinates represents the search key for the piece of byte range on the plane;
  storing division information, wherein the division information indicates the determined coordinates of the search key and the piece of byte range of the LAS data file corresponding to the search key, and the piece of byte range represents a search range in the LAS data file corresponding to the search key;
  receiving a search request including the search range of the LAS data file;
  searching the piece of byte range of the LAS data file included in the search range of the LAS data file on the basis of the division information, the searching further comprising:
    calculating a range obtained by extending the search range of the LAS data file by the predetermined distance,
    specifying the search key within the extended search range on the basis of the division information, and
    searching the piece of byte range of the LAS data file corresponding to the specified search key; and
  outputting a result of the searching.

4. The data storage method according to claim 3, further comprises:
  receiving an acquisition request for data including the piece of byte range of the LAS data file; and
  retrieving and outputting, in response to the receiving of the acquisition request, the data of the piece of byte range from the LAS data file.

5. A computer-readable non-transitory recording medium storing computer-executable data storage program instructions that when executed by a processor cause a computer system to execute operations comprising:
  obtaining Light Detecting and Ranging ("LiDAR) data by plotting a series of values of LiDAR Aerial Survey ("LAS") data on a plane with latitude and longitude as axes from an LAS data file, wherein
    the LAS data file is associated with terrain information data measured by a LiDAR sensor,
    the LAS data file includes LAS data, and
    the LAS data indicates a curve having an amplitude with respect to a measurement path with a latitude and longitude as axes;
  determining coordinates representing a search key for each of a plurality of byte range divisions on the plane, wherein the coordinates comprise a latitude and a longitude;
  dividing the LAS data file into a plurality of byte ranges, wherein a piece of byte range of the plurality of byte ranges comprises a piece of continuous LAS data in a byte range division of the plurality of byte range divisions within a predetermined distance from a piece of coordinates, and the piece of coordinates represents the search key for the piece of byte range on the plane;

storing division information, wherein the division information indicates the determined coordinates of the search key and the piece of byte range of the LAS data file corresponding to the search key, and the piece of byte range represents a search range in the LAS data file corresponding to the search key;

receiving a search request including the search range of the LAS data file;

searching the piece of byte range of the LAS data file included in the search range of the LAS data file on the basis of the division information, the searching further comprising:
    calculating a range obtained by extending the search range of the LAS data file by the predetermined distance,
    specifying the search key within the extended search range on the basis of the division information, and
    searching the piece of byte range of the LAS data file corresponding to the specified search key; and outputting a result of the searching.

6. The computer-readable non-transitory recording medium according to claim 5, the computer-executable data storage program instructions that when further executed by a processor cause a computer system to execute operations comprising:

receiving an acquisition request for data including the piece of byte range of the LAS data file; and retrieving and outputting, in response to the receiving of the acquisition request, the data of the piece of byte range from the LAS data file.

* * * * *